Aug. 19, 1958     G. J. HENRY     2,848,187
BALL TYPE SWIVEL VALVE SEAT
Filed Jan. 4, 1954
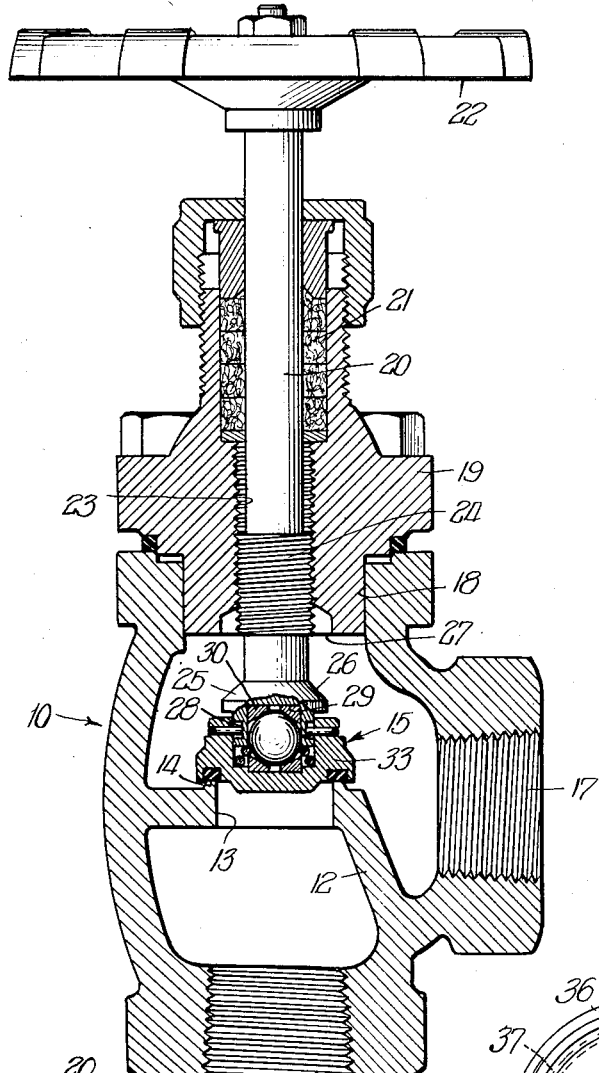
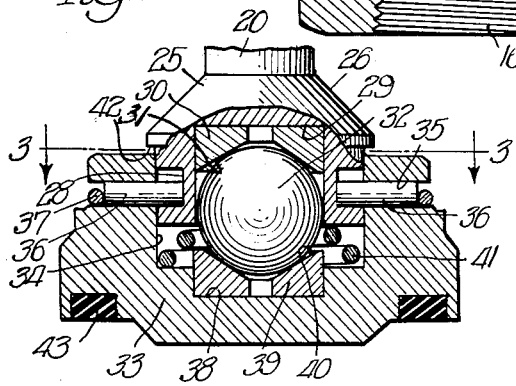
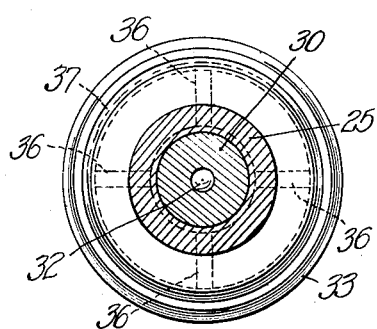
INVENTOR.
Guy J. Henry,
BY
Cromwell, Greist & Warden
Attys.

United States Patent Office 2,848,187
Patented Aug. 19, 1958

2,848,187

BALL TYPE SWIVEL VALVE SEAT

Guy J. Henry, Arlington Heights, Ill.; The Northern Trust Company and Bessie D. Henry, executors of said Guy J. Henry, deceased, assignors to Henry Valve Company, Incorporated, Melrose Park, Ill., a corporation of Illinois Application January 4, 1954, Serial No. 401,970

4 Claims. (Cl. 251—85)

The present invention relates to an improved swivel valve seat assembly for a valve, which is engaged with an annular port of the valve under axial thrust of an elongated stem threaded in a valve housing. Improved provisions are made for swiveling a valve sealing seat disk on the stem, so as to make a non-rotative axial engagement of the seat disk with the valve port, even after repeated use. These include the provision of a thrust transmitting ball engaged and centered by axially aligned, conical inserts of hardened material which transmit thrust from the stem through the ball to the seat disk. The possibility of direct thrust engagement of the rotative stem with the seat is prevented as will be described, and as a consequence a twisting engagement of the seat against the valve port, which has the effect of damaging the annular, relatively soft, port sealing insert usually associated with the seat, is also avoided. This application is a continuation-in-part of my copending application, Serial No. 160,359, filed May 5, 1950, now abandoned.

Experience has shown that when a ball bearing type thrust transmitting member is employed between opposed conical ball engaging surfaces on an actuating stem and a valve seat disk, respectively, the very hard thrust ball will eventually load itself or "brinell" substantially into stem and disk at those conical surfaces. This is particularly true when the stem and/or disk are formed of a relatively soft material such as brass or like non-ferrous metal. The action increases the uncompressed axial play between the stem and disk, however, a more serious disadvantage resides in the fact that the stem will itself eventually engage the disk, rather than transmitting all of its thrust through the ball. Since the stem is rotatively actuated, a rotative twist will then be frictionally transferred from the stem to the disk; this in turn has the effect of destructively twisting, against the annular valve port to be sealed, a relatively soft annular sealing ring or insert usually carried on the lower end of the disk. The torque effect either abrades and disfigures the soft insert, or tends to shift or dislodge the same from the disk, so that after a relatively short use the valve fails to seal effectively.

Valve seat assemblies of the type represented herein are frequently supplied for installation in the field. That is, in many instances a valve bore and a valve port or seat are machined in an existing fluid handling unit, for example a compressor, rather than in an individual valve casing or body, the valve seat assembly, per se, being supplied by its manufacturer for installation in the unit on location. In such instances the manufacturer of the valve seat assembly has no control as to the maintenance of proper alignment of the valve seat with the field-machined bore and port.

Accordingly, it is highly desirable to provide a seat assembly, as the present invention does, which will unfailingly preserve proper alignment of the swiveled parts through the agency of an interposed, thrust transmitting ball. Such assembly will, of course, preserve alignment relative to the intended bore and port only if the relationship of the ball to the valve stem and seating disk is insured against deviation as the result of wear, abrasion or "brinell" action. It is therefore a particular objective of the invention to provide a ball type, swivel disk valve seat assembly, featuring a hardened ball which transmits axial thrust between a rotative actuating stem and a sealing seat disk by the additional aid of hardened inserts, of stainless steel or equivalent wear-resistant material, which are interposed on opposite axial sides of the ball between the same and the stem and the seat disk, respectively. These hardened inserts prevent the possibility that the ball will "brinell" into either the stem or the seating disk, assuming them to be of relatively soft material. The hardened inserts insure that there will never be an axial thrust engagement of the stem with the disk, thrust being transmitted solely through the ball. Hence the seat disk will never be subject to any substantial rotative twist, transferred from the stem, which would in turn damage or dislodge the soft annular bottom sealing ring of the disk by twisting it against the sealed port.

The foregoing statements are indicative in a general way of the nature of the invention. Other objects will be apparent to those skilled in the art upon a full understanding of the construction and operation of the improved valve seat.

A single embodiment of the invention is presented herein for purpose of illustration. It will be appreciated that the invention is susceptible of incorporation in other modified forms coming equally within the scope of the appended claims.

In the drawing:

Fig. 1 is a view in longitudinal, axial section through a rotative stem type fluid handling valve which incorporates the swivel valve seat of the invention;

Fig. 2 is a fragmentary enlarged view, in section similar to Fig. 1, of the improved ball swivel seat structure of the valve; and Fig. 3 is a view in transverse horizontal section along a line corresponding to line 3—3 of Fig. 2.

Referring to Fig. 1, the reference numeral 10 designates a conventional type of valve body characterized by an internal valve chamber divided by a transverse partition 12 in which an annular circular valve port 13 is formed. This port terminates in an upwardly extending annular bead 14 which is engaged by the valve seat of the invention, generally designated 15. Threaded inlet and discharge passages 16, 17, respectively, communicate with the chamber on opposite sides of the port 13.

An axial upper body bore 18 aligned with the inlet passage 16 is closed by a hollow bonnet or cap 19 sealingly applied to the body 10 in a well known fashion. A valve actuating stem 20 of brass or like metal extends through a compressible packing 21 applied to the cap 19 in entirely conventional manner, and the stem 20 is provided with an actuating hand piece 22 externally of the valve body and packing.

The axial bore of cap 19 is internally threaded at 23 to receive the threads 24 on stem 20, whereby rotative movement of the hand piece 22 raises and lowers the stem, as well as the valve seat 15 which is associated therewith as a coacting component. The foregoing details of valve structure are well known to those skilled in the art.

The improved valve seat 15 includes an integral end enlargement 25 of the stem located beneath the thread 24 thereon, said enlargement having a conical shoulder 26 adapted to back seat against the enlarged lower margin 27 of the valve cap bore. The stem enlargement 25 is also provided with an annular groove 28 about the side wall thereof and an axially downwardly opening, circular insert receiving recess 29 on its lower end face. Recess 29 receives a circular hardened or stainless steel insert 30 which has a dished conical lower thrust transmitting surface 31, and this surface engages and centers a hardened swivel ball 32 of stainless steel.

The reference numeral 33 designates a valve seat member in the form of a circular disk of brass or like metal having an upwardly opening recess 34 into which the enlargement or head 25 of the stem 20 is telescopingly inserted. The wall of the recess is radially bored at 35 for the reception of a plurality of coupling pins 36; these extend into the annular groove 28 of the enlargement for the purpose of axially coupling together the stem and seat disk 33. The pins are held in place by a split ring 37 applied externally thereof.

Recess 34 of seat disk 33 has a circular counter bore 38 aligned with disk recess 29. A hardened or stainless steel insert 39 identical to insert 30 is disposed in counter bore recess 38, this insert being provided with an upwardly facing conical thrust receiving surface 40 engaged by ball 32 when the stem is urged downwardly. A conical coiled compression spring 41 is disposed between the enlarged stem head 25 and seat disk 33, its larger end encircling hardened insert 39. Spring 41 causes the lower side wall of stem groove 28 to be urged upwardly against pins 36 and the latter to be forced upwardly in relation to the radial bores 35 which receive them. It is the sole function of the pins 36 to axially couple the stem 20 and disk 33 against separation. They do not serve to transmit sealing thrust from the stem to the disk; that office is performed solely by the hardened swivel ball 32 and conical inserts 30, 39. It is distinctly not the purpose of the lower, radially extending shoulder 42 to exert this thrust, for if shoulder 42 engages the top of disk 33 the rotation of the shoulder is frictionally transferred to the disk. It is desired to avoid this because an annular sealing element 43 of relatively soft material, such as a soft metal, hard rubber, plastic or fiber, is usually disposed in an annular axial groove formed in the lower end surface of disk 33. This insert engages the annular port bead 14 when the seat is closed thereon, and a rotative twist on the relatively soft seal ring 43 is unduly destructive to the ring and tends to dislodge the same from its groove. An annular sealing depression is formed in the insert 43 after the first few non-rotative compressions thereof against the port and the inserts thereafter preserve alignment of the soft insert and port throughout a long life.

In operation, rotative manipulation of threaded stem 20 urges the latter downwardly into engagement of seat disk insert 43 with port bead 14, thereupon slightly compressing the spring and taking up any relatively slight lost movement between the stem head 25, to the degree that its movement is limited by ball 32, the pins 36 and the seat disk 33. The insert 39 engages gently against the port with little or no rotative friction so as to insure proper engagement of the insert depression with the port. This unfailingly takes place at the same circular zone because of the centering of the ball 32 by the conical surfaces 31, 40 of the hardened inserts 30, 39 seat disk. The force of the initial engagement is insufficient to shift or distort the metal of the ring or insert 43 and the very slight rotation of the member 32 which may occur at initial engagement with the port is entirely insufficient to cause material wearing action of the latter.

Upon engagement of the conical thrust surfaces with the ball, full axial thrust under non-rotative pressure is transmitted to disk 33, causing the same to seal effectively over valve port 13. Upon reverse rotation of stem 20, the disk 33 maintains sealing engagement without rotation until the pressure on ball 32 is relieved and disk 33 is lifted from the port.

Hardened inserts 30, 39 prevent an axial wearing or "brinell" action on the part of ball 32 such as might eventually result in direct engagement of lower stem shoulder 42 with the top of disk 33. Accordingly, the only rotative twist to which the disk is ever subject is the negligible frictional twist which occurs as insert 43 initially touches port sealing element 14.

The parts of the above described valve seat structure are simple, inexpensive and cheaply assembled. Wear in use is reduced to a minimum and engagement of the seat with the valve port remains satisfactory throughout a long life, whether the improved seat assembly is part of an original valve manufacture or is simply intended for field installation. Compressive thrust is applied centrally at all times and the parts are kept in properly centered relation to one another. The described floating disk construction is particularly desirable in valves of medium, say, 1¼ inch port, size and upwards.

I claim:

1. A swivel type valve seat comprising a seating member engageable with an annular valve port upon axial movement of said member, a rotatable stem member having means to shift the same axially upon rotative movement thereof, said stem and seating members having portions thereof disposed in axially telescoped relation which are provided with opposed axially aligned insert receiving recesses, a hard thrust ball disposed axially between said members, a thrust insert in each of said recesses between said ball and said members, said inserts each having a conical wear surface engaging the ball to transmit axial thrust from said stem member through said ball and inserts to said seating member upon axial movement of the stem member, resilient means carried in one of said recesses and acting on said members in a direction to separate the same, and connecting means to couple said stem and seating members against axial separation.

2. A swivel type valve seat comprising a seating member engageable with an annular valve port upon axial movement of said member, a rotatable stem member having means to shift the same axially upon rotative movement thereof, said stem and seating members having portions thereof disposed in axially telescoped relation which are provided with opposed axially aligned insert receiving recesses, a hard thrust ball disposed axially between said members, a thrust insert in each of said recesses between said ball and said members, said inserts each having a conical wear surface engaging the ball to transmit axial thrust from said stem member through said ball and inserts to said seating member upon axial movement of the stem member, a spring surrounding one of said inserts and acting on said members in a direction to separate the same, and means to couple said stem and seating members against axial separation, said seating member having a relatively soft annular sealing element fixedly mounted on the axial side thereof remote from said stem which non-rotatively engages said valve port as the seating member is compressed by said thrust.

3. A swivel type valve seat comprising a seating member provided with a compressible insert engageable with an annular valve port upon axial movement of said seating member, a rotatable stem having means to shift the same axially upon rotative movement thereof, said stem and seating member having portions thereof disposed in axially telescoped relation which are provided with opposed axially aligned insert receiving recesses, separate relatively hard inserts in said recesses axially abutting said stem and seating member, said inserts being provided with oppositely facing, shaped thrust surfaces at the telescoped portions of the stem and seating member, a hard thrust ball disposed between said surfaces to transmit axial thrust from said stem through said inserts and ball to said seating member upon axial movement of the stem, a spring centered in one of said recesses and acting between said stem and member to separate the same, and a plurality of radial pins coacting with the telescoped portions of said stem and seating member to couple the same against axial separation by said spring.

4. A swivel type valve seat comprising a seating member engageable with an annular valve port upon axial movement of said member, a rotatable stem member having means to shift the same axially upon rotative movement thereof, said stem and seating members having portions thereof disposed in axially telescoped relation which are provided with opposed axially aligned insert receiving recesses, a hard thrust ball disposed axially between said members, a thrust insert in each of said recesses between said ball and said members, said inserts each having a conical wear surface engaging the ball to transmit axial thrust from said stem member through said ball and inserts to said seating member upon axial movement of the stem member, resilient means carried in one of said recesses and acting on said members in a direction to separate the same, and connecting means to couple said stem and seating members against axial separation, said connecting means defining a loose connection between said members to allow substantially free rotative movement of said stem member relative to said seating member and a limited degree of axial relative movement therebetween.

References Cited in the file of this patent
UNITED STATES PATENTS

| | | |
|---|---|---|
| 600,360 | Crane | Mar. 8, 1898 |
| 1,293,976 | Taylor | Feb. 11, 1919 |
| 1,411,904 | Block | Apr. 4, 1922 |
| 1,693,032 | Henry | Nov. 27, 1928 |
| 1,763,927 | Ireland | June 17, 1930 |
| 1,991,052 | Derby | Feb. 12, 1935 |
| 2,277,395 | Franck | Mar. 24, 1942 |
| 2,281,689 | Hare | May 5, 1942 |
| 2,352,249 | Briggs | June 27, 1944 |